United States Patent
Yoshida et al.

(10) Patent No.: US 7,950,050 B2
(45) Date of Patent: May 24, 2011

(54) AUTHENTICATION SYSTEM, AUTHENTICATION-SERVICE-PROVIDING DEVICE, AUTHENTICATION-SERVICE-PROVIDING METHOD, AND COMPUTER-READABLE MEDIUM

(75) Inventors: Takeo Yoshida, Tokyo (JP); Ryuichi Aoki, Tokyo (JP)

(73) Assignee: Fuji Xerox Co., Ltd., Tokyo (JP)

( * ) Notice: Subject to any disclaimer, the term of this patent is extended or adjusted under 35 U.S.C. 154(b) by 996 days.

(21) Appl. No.: 11/751,778

(22) Filed: May 22, 2007

(65) Prior Publication Data

US 2008/0098466 A1 Apr. 24, 2008

(30) Foreign Application Priority Data

Oct. 19, 2006 (JP) .................................. 2006-285251

(51) Int. Cl.
*G06F 7/04* (2006.01)
(52) U.S. Cl. .................................. 726/5; 726/2; 713/182
(58) Field of Classification Search .................. 726/5, 2; 713/182
See application file for complete search history.

(56) References Cited

U.S. PATENT DOCUMENTS 7,529,934 B2 * 5/2009 Fujisawa et al. .............. 713/168
2006/0080542 A1 4/2006 Takeuchi et al.
2007/0006299 A1 * 1/2007 Elbury et al. .................. 726/19

FOREIGN PATENT DOCUMENTS

| JP | 2001-282742 | 10/2001 |
|----|-------------|---------|
| JP | 2002-251375 | 9/2002 |
| JP | 2004-086544 | 3/2004 |
| JP | 2006113624 | 4/2006 |
| KR | 1020050087560 | 8/2005 |

OTHER PUBLICATIONS

Office Action issued on Mar. 28, 2008 from the Korean Patent Office for corresponding Korean Patent Application No. 10-2007-0056688, with English translation.

* cited by examiner

*Primary Examiner* — Kambiz Zand
*Assistant Examiner* — Amare Tabor
(74) *Attorney, Agent, or Firm* — Gauntier & Connors LLP (57) ABSTRACT

An authentication system includes: a first information processor; a second information processor; an authentication-service-providing device; and an authentication device, wherein the authentication-service-providing device has: an unit that receives second authentication information for authenticating a user from the second information processor and executes a second authentication based on the second authentication information; and an unit that issues third authentication information to the second information processor when the second authentication is successful; and the authentication device has: an unit that receives first authentication information for authenticating the user from the first information processor and executes a first authentication based on the first authentication information; and an unit that receives, from the first information processor, third authentication information obtained by the second information processor and input to the first information processor and cooperates with the authentication-service-providing device to obtain a result of a third authentication based on the third authentication information.

19 Claims, 8 Drawing Sheets

AUTHENTICATION SYSTEM, AUTHENTICATION-SERVICE-PROVIDING DEVICE, AUTHENTICATION-SERVICE-PROVIDING METHOD, AND COMPUTER-READABLE MEDIUM

CROSS-REFERENCE TO RELATED APPLICATIONS

This application is based on and claims priority under 35 USC 119 from Japanese Patent Application No. 2006-285251 filed on Oct. 19, 2006.

BACKGROUND

1. Technical Field

The present invention relates to an authentication system, an authentication-service-providing device, an authentication-service-providing method, and a computer-readable medium.

2. Related Art

In the related art, there is known, as a typical authentication system, a system in which a client device sends authentication information of a user (such as a user ID and a password) to a server device and the server device authenticates the user on the basis of the authentication information.

SUMMARY

According to one aspect of the present invention, there is provided an authentication system including: a first information processor; a second information processor; an authentication-service-providing device; and an authentication device, wherein the second information processor has: a second authentication information transmission unit that transmits second authentication information for authenticating a user to the authentication-service-providing device; and an authentication information obtaining unit that obtains third authentication information issued by the authentication-service-providing device in response to the second authentication information; the authentication-service-providing device has: a second authentication unit that receives the second authentication information from the second information processor and executes a second authentication based on the second authentication information; and an authentication information issuance unit that issues the third authentication information to the second information processor when the second authentication is successful; the first information processor has: a first authentication information transmission unit that receives input of first authentication information for authenticating the user and transmits the first authentication information to the authentication device; and a third authentication information transmission unit that receives input of third authentication information obtained by the second information processor and transmits the third authentication information to the authentication device; and the authentication device has: a first authentication unit that receives the first authentication information from the first information processor and executes a first authentication based on the first authentication information; and a third authentication result obtaining unit that receives the third authentication information from the first information processor and cooperates with the authentication-service-providing device to obtain a result of a third authentication based on the third authentication information.

BRIEF DESCRIPTION OF THE DRAWINGS

Exemplary embodiments of the present invention will be described in detail by reference to the following figures, wherein.

DETAILED DESCRIPTION

Exemplary embodiments of the present invention will now be described with reference to the drawings.

First Exemplary Embodiment

Figure 1:
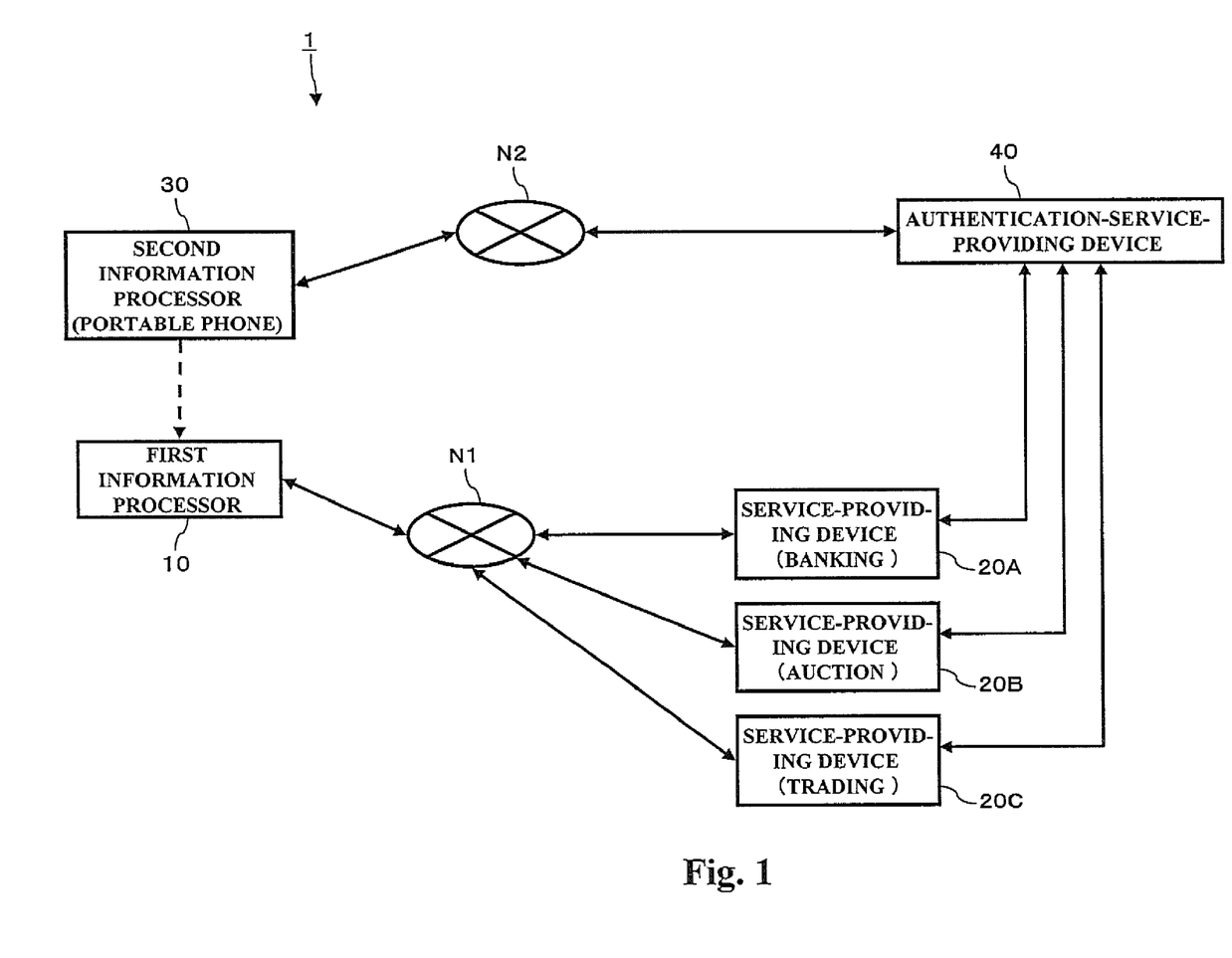
FIG. 1 is a block diagram showing the overall structure of a system including an authentication system according to a first exemplary embodiment of the present invention.

FIG. 1 is a block diagram showing the overall structure of a system 1 including an authentication system according to a first exemplary embodiment of the present invention. In FIG. 1, the system 1 has a first information processor 10, and service-providing devices 20A, 20B, and 20C (hereinafter collectively referred to as "service-providing device 20") connected to the first information processor 10.

The first information processor 10 is a device which receives provision of a service from the service-providing device 20. The service-providing device 20 is a device which provides a service to the first information processor 10. In the first exemplary embodiment, the first information processor 10 is a client computer such as a personal computer used by a user, the service-providing device 20 is a server computer, and the first information processor 10 and the service-providing device 20 are connected to each other through the Internet N1. No particular limitation is imposed on the service provided by the service-providing device 20. For example, the service-providing devices 20A, 20B, and 20C may provide a banking service, an auction service, and a trading service, respectively.

The service-providing device 20 is a device which has a function as an authentication device which authenticates a user and provides a service to the first information processor 10 of a user when the authentication of the user is successful. In the first exemplary embodiment, first and second authentications are employed for authenticating the user, and the service is provided when both authentications are successful.

The first authentication will now be described. The first information processor 10 receives an input of first authentication information (for example, user ID and password) from a user and transmits the first authentication information to the service-providing device 20. The service-providing device 20 receives the first authentication information from the first information processor 10, and executes the first authentication based on the first authentication information.

Next, the second authentication will be described. The system 1 has, as constituent elements for realizing second authentication, a second information processor 30, and an authentication-service-providing device 40 connected to the second information processor 30.

The second information processor 30 is a device which sends to the authentication-service-providing device 40 second authentication information for authenticating the user.

The authentication-service-providing device 40 is a device which receives the second authentication information from the second information processor 30 and executes the second authentication based on the second authentication information.

In the first exemplary embodiment, the second information processor 30 is a portable phone and the authentication-service-providing device 40 is a server computer (for example, an official site of the portable phone company). The second information processor 30 and the authentication-service-providing device 40 are connected to each other via a portable telephone network N2.

In the first exemplary embodiment, as will be described, the result of the second authentication by the service-providing-device 20 is checked by means of a third authentication.

The authentication-service-providing device 40 issues third authentication information (for example, a one-time password) to the second information processor 30 when the second authentication is successful, and the second information processor 30 obtains the third authentication information from the authentication-service-providing device 40. In this structure, a user obtains the third authentication information from the authentication-service-providing device 40 through the second information processor 30 and inputs the third authentication information to the first information processor 10. The first information processor 10 transmits the input third authentication information to the service-providing device 20. The service-providing device 20 receives the third authentication information from the first information processor 10, and obtains the result of the third authentication based on the third authentication information by cooperation with the authentication-service-providing device 40. Specifically, in the first exemplary embodiment, the service-providing device 20 transmits the third authentication information received from the first information processor 10 to the authentication-service-providing device 40, the authentication-service-providing device 40 executes the third authentication based on the third authentication information, and notifies the result of the third authentication to the service-providing device 20. That is, the service-providing device 20 inquires the authentication-service-providing device 40 as to whether or not the third authentication information is accurate. With this process, a check is made as to whether or not the user of the first information processor 10 is a valid user who succeeded in the second authentication.

In the first exemplary embodiment, the third authentication information can be used for all (in FIG. 1, three) service-providing devices 20. In other words, the user can use the third authentication information obtained from the authentication-service-providing device 40 for an arbitrary service.

In the example configuration of FIG. 1, one first information processor 10 is shown, but multiple first information processors 10 can be connected to the service-providing device 20. Similarly, although one second information processor 30 is shown in the example configuration of FIG. 1, multiple second information processors 30 may be connected to the authentication-service-providing device 40. In addition, although three service providing devices 20 are shown in the example configuration of FIG. 1, one or multiple service-providing devices 20 may be connected to the authentication service providing device 40.

Figure 2:
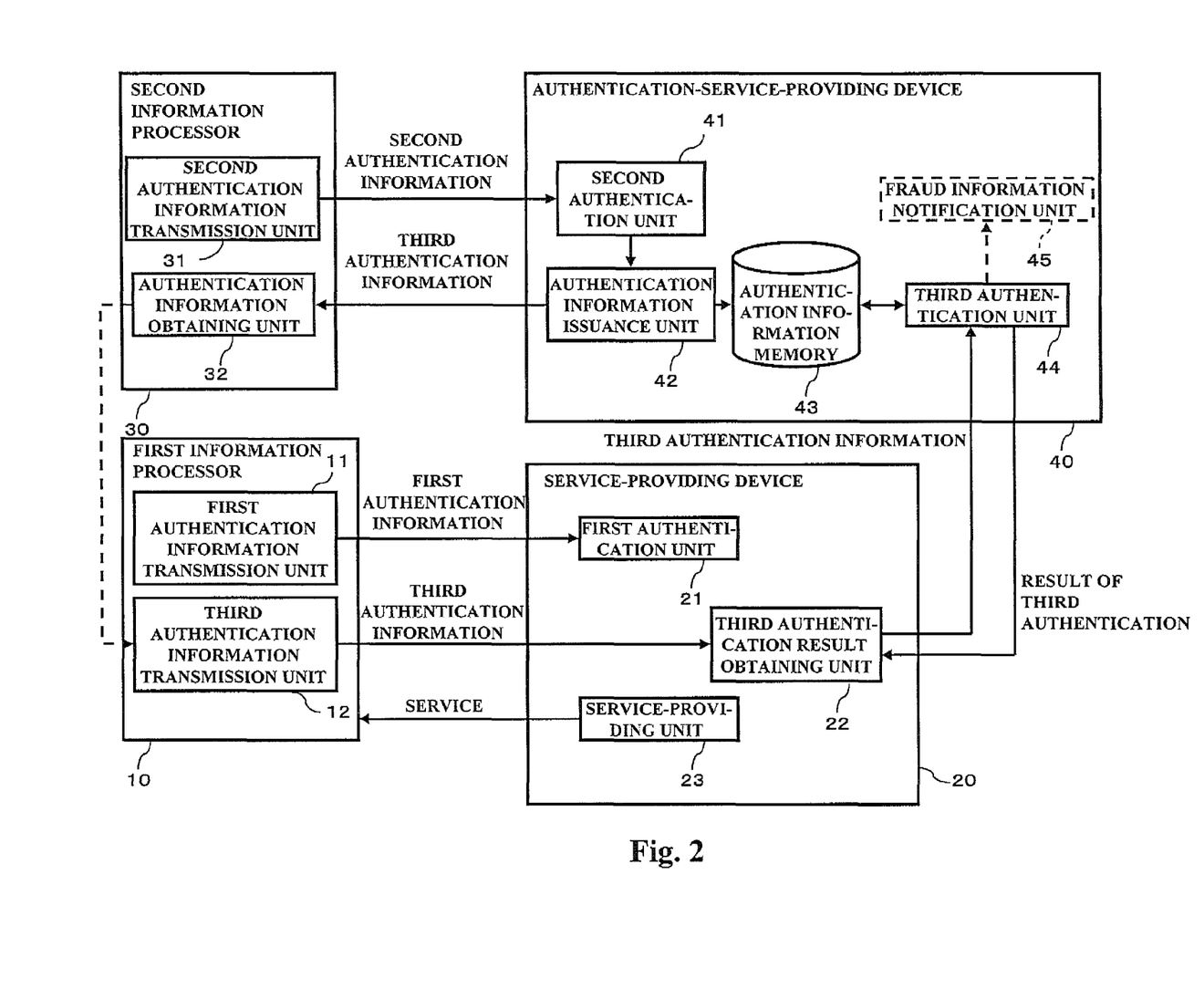
FIG. 2 is a block diagram showing a functional structure of a system including the authentication system according to the first exemplary embodiment.

FIG. 2 is a block diagram showing the functional structure of the system 1 including the authentication system according to the first exemplary embodiment. Functional structures of the devices 10-40 in the system 1 will now be described by reference to FIG. 2.

[Second Information Processor]

The second information processor 30 has a second authentication information transmission unit 31 and an authentication-information-obtaining unit 32.

The second authentication information transmission unit 31 transmits to the authentication-service-providing device 40 the second authentication information for authenticating a user. The second authentication information may be, for example, an individual identification ID of the second information processor 30 (for example, an individual identification number embedded in a portable phone or a phone number of the portable phone), a user ID and a password, biometric authentication information, an electronic certificate, a combination of these pieces of information, etc.

The authentication-information-obtaining unit 32 obtains the third authentication information issued from the authentication-service-providing device 40 according to the second authentication information.

[Authentication-Service-Providing Device]

The authentication-service-providing device 40 has a second authentication unit 41, an authentication information issuance unit 42, an authentication information memory 43, and a third authentication unit 44.

The second authentication unit 41 receives the second authentication information from the second information processor authentication information. Here, the second authentication is executed by, for example, matching the received second authentication information and second authentication information registered in advance in the authentication-service-providing device 40.

The authentication information issuance unit 42 issues the third authentication information to the requesting second information processor 30 when the second authentication by the second authentication unit 41 is successful.

In the first exemplary embodiment, the third authentication information has a validity period and also is one-time information. In other words, the third authentication information becomes invalid when the validity period (for example, one minute) expires or when the third authentication information has been used once for authentication. The third authentication information may be, for example, a password including a random number.

The authentication information memory 43 stores the third authentication information issued by the authentication information issuance unit 42. In the first exemplary embodiment, the authentication-service-providing device 40 deletes, from the authentication information memory 43, the third authentication information whose validity period has expired or which has been used for authentication.

The third authentication unit 44 receives the third authentication information from the service-providing device 20, executes the third authentication based on the received third authentication information and the issued third authentication information, and reports a result of the authentication to the service-providing device 20. In the first exemplary embodiment, the third authentication unit 44 determines whether or not the received third authentication information matches any of the pieces of third authentication information stored in the authentication information memory 43, and reports success of authentication when there is a match and reports failure of authentication when there is no match.

[First Information Processor]

The first information processor 10 has a first authentication information transmission unit 11 and a third authentication information transmission unit 12.

The first authentication information transmission unit 11 receives input of first authentication information for authenticating a user and transmits the first authentication information to the service-providing device 20. The first authentication information may be, for example, a user ID and a password, biometric authentication information, an electronic certificate, a combination of these pieces of information, etc.

The third authentication information transmission unit 12 receives input of third authentication information obtained by the second information processor 30 and transmits the third authentication information to the service-providing device 20. In the first exemplary embodiment, the third authentication information is displayed on a display screen of the second information processor 30, read by a user, and input to the first information processor 10.

[Service-Providing Device]

The service-providing device 20 has a first authentication unit 21, a third authentication result obtaining unit 22, and a service-providing unit 23.

The first authentication unit 21 receives the first authentication information from the first information processor 10, and executes the first authentication based on the first authentication information. The first authentication may be executed, for example, by matching the first authentication information received from the first information processor 10 with authentication information registered in advance in the service-providing device 20.

The third authentication result obtaining unit 22 receives the third authentication information from the first information processor 10, and obtains a result of the third authentication based on the third authentication information by cooperation with the authentication-service-providing device 40. In the first exemplary embodiment, the third authentication result obtaining unit 22 transmits the third authentication information received from the first information processor 10 to the authentication-service-providing device 40, and receives, from the authentication-service-providing device 40, notification of the result of the third authentication based on the third authentication information at the authentication-service-providing device 40.

The service-providing unit 23 provides a predetermined service to the first information processor 10 transmitting the first and third authentication information when both the first and third authentications are successful.

In the first exemplary embodiment, the devices 10-40 are realized through cooperation of a hardware resource and software. Here, the hardware resources include a CPU (Central Processing Unit), a ROM (Read Only Memory), a main memory, an external storage device, an input device, a display device, and a communication device. The software includes, for example, an Operating System and various application programs. More specifically, the functions of the devices 10-40 are realized by a program recorded on a recording medium being read into a main memory and executed by a CPU. The programs of the devices 10-40 may be provided on a recording medium such as CD-ROM or may be provided through a communication unit. A portion or all of the functions of the devices 10-40 may be realized solely by the hardware.

In the first exemplary embodiment, the communication between the first information processor 10 and the service-providing device 20 is performed through web communication between a web browser on the first information processor 10 and a web server on the service-providing device 20. The communication between the second information processor 30 and the authentication-service-providing device 40 is performed through web communication between a web browser on the second information processor 30 and a web server on the authentication-service-providing device 40. No particular limitation is imposed on the form of communication between the devices.

Figure 3:
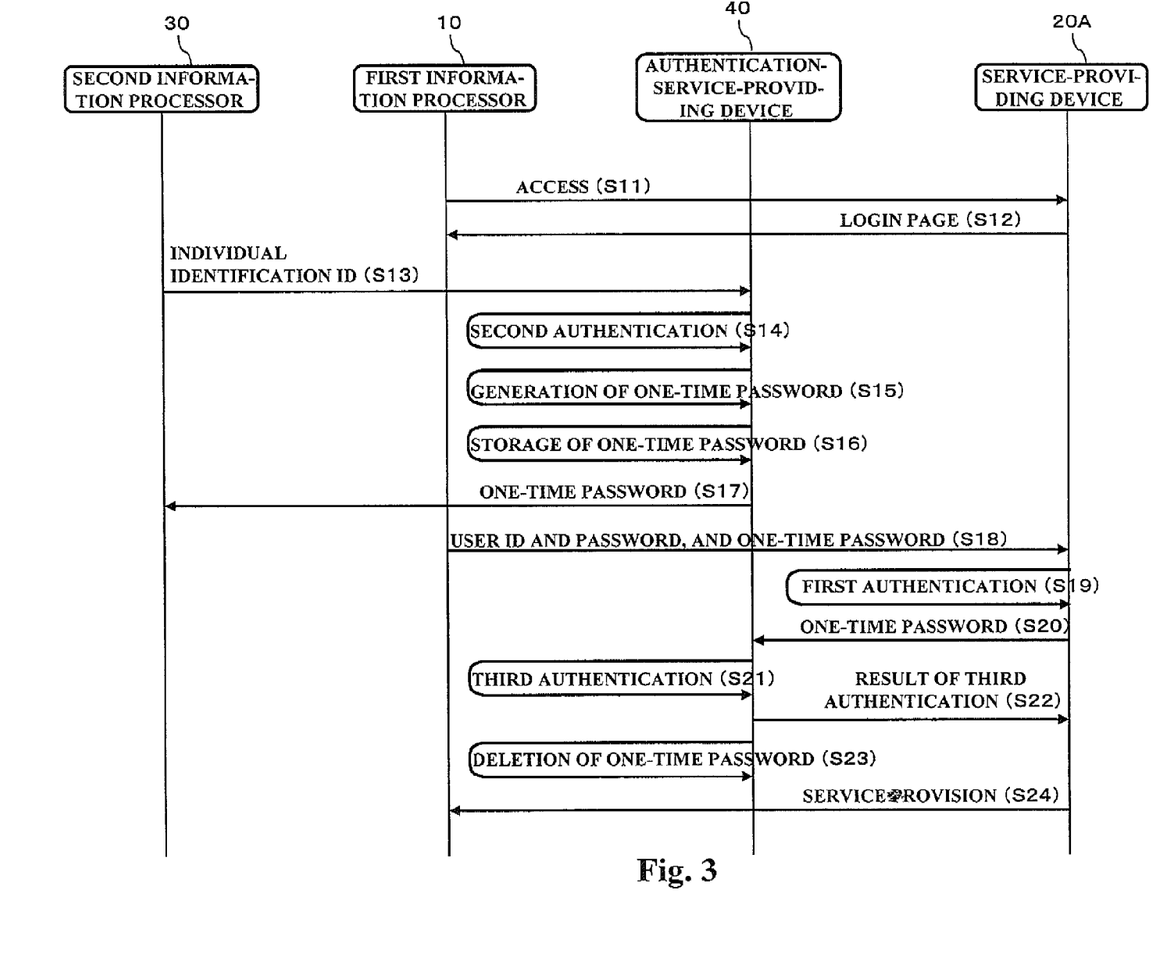
FIG. 3 is a sequence diagram showing an operation process of a system including the authentication system according to the first exemplary embodiment.

FIG. 3 is a sequence diagram showing an operation process of the system 1 including an authentication system according to the first exemplary embodiment. An operation of the system 1 will now be described in detail with reference to FIG. 3.

Prior to the provision of service, the first authentication information (which in this example configuration is the user ID and password) for authenticating the user is registered in the service-providing device 20, and authentication information for authenticating a user (here, individual identification ID of the second information processor 30 owned by the user) is registered in the authentication-service-providing device 40.

Figure 4:
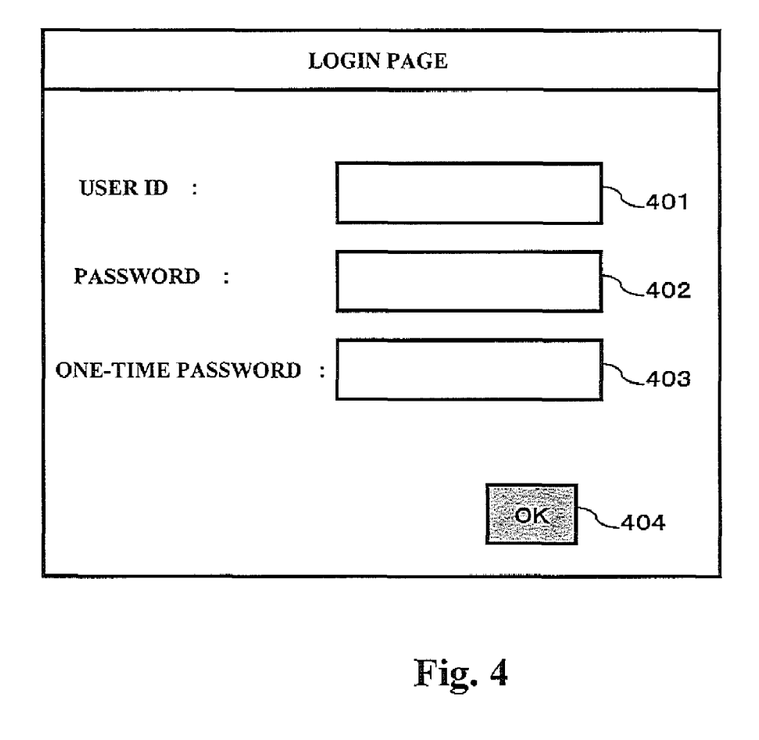
FIG. 4 is a diagram showing an exemplary login page displayed on a first information processor in the first exemplary embodiment.

When a user wishes to use the service of the service-providing device 20A, the user inputs an address (for example, "http://abcbank.co.jp/login/" of the service-providing device 20A through the web browser of the first information processor 10. When the first information processor 10 receives the input of the address, the first information processor 10 accesses the service-providing device 20A by reference to the address (S11). The service-providing device 20A transmits a login page to the first information processor 10 in response to the access, and the first information processor 10 receives the login page and displays the login page on a web screen (S12). As shown in FIG. 4, the login page has an input column 401 for user ID, an input column 402 for password, and an input column 403 for one-time password (third authentication information).

Then, the user inputs an address of the authentication-service-providing device 40 through the web browser of the second information processor 30. When the second information processor 30 receives the input of the address, the second information processor 30 accesses the authentication-service-providing device 40 by reference to the address. In response to the access, the authentication-service-providing device 40 transmits an authentication information issuance page to the second information processor 30. The second information processor 30 receives the authentication information issuance page and displays the authentication information issuance page on the web screen. Then, when the second information processor 30 receives, from a user, an issuing instruction of a one-time password on the authentication information issuance page (for example, pressing of a "request issuance of on-time password" button), the second information processor 30 transmits the individual identification ID of the second information processor 30 to the authentication-service-providing device 40 (S13).

When the authentication-service-providing device 40 receives the individual identification ID, the authentication-service-providing device 40 executes the second authentication based on the individual identification ID (S14). Specifically, the authentication-service-providing device 40 determines whether or not the received individual identification ID matches any of registered individual identification IDs.

When the second authentication fails; that is, when the individual identification ID does not match any of the registered individual identification IDs, the authentication-service-providing device 40 notifies the second information processor 30 that authentication has failed.

When, on the other hand, the second authentication is successful; that is, when the individual identification ID matches a registered individual identification ID, the authentication-service-providing device 40 generates a one-time password including a random number as third authentication information (S15). Then, the authentication-service-providing device 40 stores the generated one-time password in the authentication information memory 43 (S16) and transmits the one-time password to the second information processor 30 (S17). The second information processor 30 receives the one-time password from the authentication-service-providing device 40 and displays the one-time password on the web screen.

The user then reads the one-time password on the web screen of the second information processor 30, inputs the user ID and password of the user and the read one-time password on the login page of the first information processor 10 as shown in FIG. 4, and presses an "OK" button 404. When the first information processor 10 receives the operation of the user, the first information processor 10 transmits the input user ID, password, and one-time password to the service-providing device 20A (S18).

When the service-providing device 20A receives the user ID, password, and one-time password from the first information processor 10, the service-providing device 20A executes the first authentication based on the user ID and the password (S19). Specifically, the service-providing device 20A determines whether or not the pair consisting of the received user ID and password matches any of the registered pairs consisting of user IDs and passwords.

When the first authentication fails; that is, when the user ID and the password do not match any of the registered user IDs and passwords, the service-providing device 20A notifies the first information processor 10 that the authentication has failed.

When, on the other hand, the first authentication is successful; that is, when the user ID and password match a registered user ID and a registered password, the service-providing device 20A transmits the received one-time password to the authentication-service-providing device 40 (S20).

When the authentication-service-providing device 40 receives the one-time password from the service-providing device 20A, the authentication-service-providing device 40 executes the third authentication based on the one-time password (S21). Specifically, the authentication-service-providing device 40 determines that the authentication is successful when the received one-time password matches the one-time password stored in the authentication information memory 43 and determines that the authentication has failed when the received one-time password does not match the stored one-time password. The authentication-service-providing device 40 then reports the result of the third authentication to the service-providing device 20A (S22).

When the third authentication is successful, the authentication-service-providing device 40 deletes the one-time password from the authentication information memory 43 (S23). The authentication-service-providing device 40 also deletes the one-time password from the authentication information memory 43 when a predetermined validity period (for example, one minute) elapses after transmission of the one-time password to the first information processor 10.

When the service-providing device 20A receives the notification of the result of third authentication from the authentication-service-providing device 40, the service-providing device 20A executes a process according to the result of the third authentication.

Specifically, when the service-providing device 20A receives a notification that the third authentication is successful, the service-providing device 20A starts provision of the service to the first information processor 10 (S24). On the other hand, when the service-providing device 20A receives a notification that the third authentication has failed, the service-providing device 20A notifies the first information processor 10 that the service cannot be used.

In one aspect of the present invention, when the authentication-service-providing device 40 is accessed by the service-providing device 20, the authentication-service-providing device 40 may authenticate the service-providing device 20.

The system 1 according to the first exemplary embodiment may also be configured in any of the following configurations (a)-(i).

(a) In configuration (a), the third authentication unit 44 of the authentication-service-providing device 40 may receive, from the service-providing device 20, identification information of the first information processor 10 transmitting the third authentication information, along with the third authentication information. The identification information of the first information processor 10 may be, for example, an address of the first information processor 10 on the network (such as an IP address).

(b) In configuration (b), the authentication-service-providing device 40 may further have a fraudulent information notification unit 45 that reports information related to fraud when the first authentication is successful and the third authentication fails. The information related to fraud may include, for example, a message indicating that there is a possibility that the first authentication information has been fraudulently obtained and information indicating the origin of the fraudulent access (such as the IP address of the transmitting first information processor). The notification destination of the information related to the fraud may be, for example, a user corresponding to the first authentication information which has been fraudulently obtained (more specifically, the mail address, phone number, facsimile number, etc. of the user), the service-providing device 20 transmitting the third authentication information, the service provider managing the service-providing device 20 (more specifically, the mail address, phone number, facsimile number, etc. of the service provider), the administrator of the authentication-service-providing device 40, and a memory accumulating the information related to fraud. The structure to notify the user corresponding to the first authentication information which has been fraudulently obtained may be realized, for example, in the following manner. Specifically, the service-providing device 20 transmits, to the authentication-service-providing device 40, user identification information for identifying a user along with the third authentication information, and, when the authentication-service-providing device 40 detects the fraudulent acquisition, the authentication-service-providing device 40 notifies a notification destination of the user (such as a mail address) which is registered in advance in correspondence to the user identification information.

(c) In configuration (c), when the authentication-service-providing device 40 receives from a user a usage termination application on-line or off-line, the authentication-service-providing device 40 may perform a usage termination process of the second authentication information of the user. Here, the usage termination process may be, for example, a deletion process of the registration of the second authentication information and a setting process of a usage termination flag corresponding to the second authentication information.

(d) In configuration (d), the configuration (c) is employed with the authentication-service-providing device 40 further reporting information related to fraud when the second authentication information from the second information processor 30 is information for which the usage termination process is applied. Here, the information related to fraud may be, for example, a message indicating that there is a possibility that the second authentication information has been fraudulently obtained and a message indicating that the second information processor 30 may have been fraudulently obtained. In addition, the notification destination of the information related to fraud may be the user corresponding to the second authentication information which has been fraudulently obtained (more specifically, the mail address, phone number, facsimile number, etc. of the user), the administrator of the authentication-service-providing device 40, or a memory which accumulates the information related to fraud.

Figure 5:
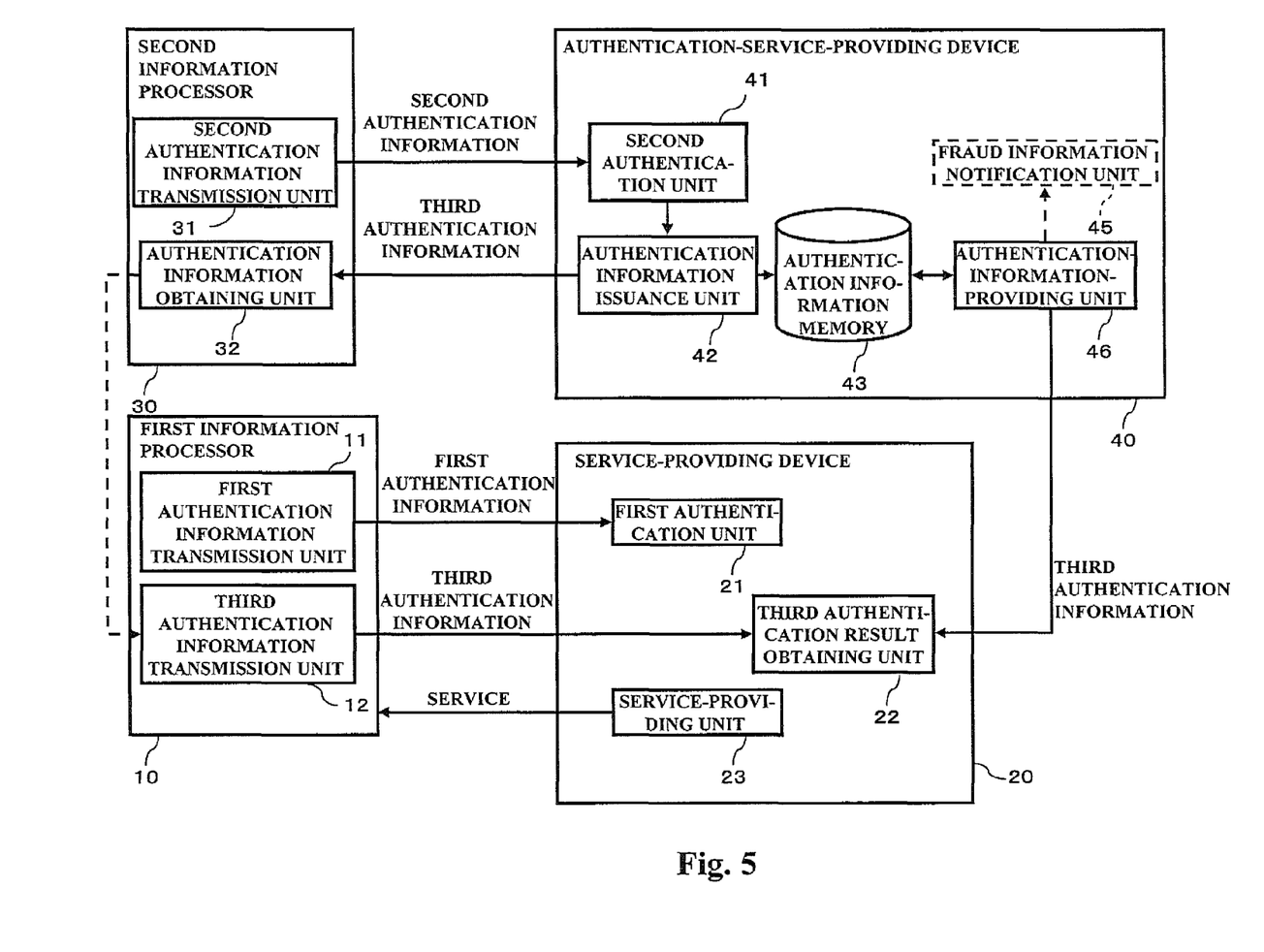
FIG. 5 is a block diagram showing a functional structure of a system in an aspect of the present invention in which a service-providing device executes a third authentication.

(e) In the above-described configuration, as a form of the service-providing-device 20 obtaining a result of the third authentication, there is described a configuration in which the service-providing device 20 obtains the result of the third authentication from the authentication-service-providing device 40. In configuration (e), the service-providing device 20 may execute the third authentication. FIG. 5 is a block diagram showing a functional structure of the system 1 in which the service-providing device 20 executes the third authentication. In FIG. 5, the authentication-service-providing device 40 has an authentication-information-providing unit 46 in place of the third authentication unit 44 of FIG. 1. The authentication-information-providing unit 46 provides issued third authentication information to the service-providing device 20.

In the above-described configuration, the third authentication is executed in the following manner. Specifically, the third authentication result obtaining unit 22 of the service-providing device 20 obtains, from the authentication-information-providing unit 46, the third authentication information issued by the authentication information issuance unit 42. The third authentication result obtaining unit 22 executes the third authentication based on the third authentication information received from the first information processor 10 and the third authentication information obtained from the authentication-information-providing unit 46. More specifically, the third authentication result obtaining unit 22 determines whether or not the third authentication information received from the first information processor 10 matches any of the third authentication information obtained from the authentication-information-providing unit 46.

(f) In configuration (f), the second information processor 30 may receive designation of a service-providing device 20 (or service) from a user and may transmit the designation to the authentication-service-providing device 40 along with the second authentication information. For example, when the authentication-service-providing device 40 receives the second authentication information from the second information processor 30, the authentication-service-providing device 40 transmits, to the second information processor 30; a list of services registered in advance in relation to the second authentication information. The second information processor 30 receives the list of services and displays the list on a web screen, receives a selection of a service from the user on the screen, and reports a selected service to the authentication-service-providing device 40.

When the second authentication based on the second authentication information is successful, the authentication-service-providing device 40 issues third authentication information dedicated for the designated service-providing device 20 (or service). More specifically, in one aspect, the authentication-service-providing device 40 stores the issued third authentication information in relation to a service ID indicating a designated service. The service-providing device 20 transmits the third authentication information to the authentication-service-providing device 40 along with the service ID of the service of the service-providing device 20. When the authentication-service-providing device 40 receives the third authentication information and the service ID, the authentication-service-providing device 40 matches the third authentication information with the third authentication information stored in relation to the service ID. In another aspect, the authentication-service-providing device 40 issues third authentication information in which the service ID indicating the designated service is embedded. The service-providing device 20 transmits the third authentication information to the authentication-service-providing device 40 along with the service ID of the service of the service-providing device 20. When the authentication-service-providing device 40 receives the third authentication information and the service ID, the authentication-service-providing device 40 determines whether or not the service ID embedded in the third authentication information matches the received service ID. When the authentication-service-providing device 40 determines that the service IDs match, the authentication-service-providing device 40 matches the received third authentication information and the stored third authentication information, and when the authentication-service-providing device 40 determines that the service IDs do not match, the authentication-service-providing device 40 determines that the authentication has failed.

(g) In configuration (g), the second information processor 30 (for example, a portable phone) may be connected to the authentication-service-providing device 40 via the first information processor 10. For example, the second information processor 30 may communicate with the authentication-service-providing device 40 via the first information processor 10 and the Internet N1. The communication between the second information processor 30 and the first information processor 10 may be wireless, such as via infrared communication, or through wires, such as via a cable connection.

(h) In configuration (h), the first information processor 10 and the second information processor 30 may be physically realized as one device. For example, it is possible to realize the first information processor 10 with a first application software and the second information processor 30 with a second application software, in one computer.

(i) In configuration (i), the second information processor 30 may have a function to lock the operation of the device. In this case, the second information processor 30 locks the operation on the basis of a lock operation by the user. When the second information processor 30 receives input of authentication information from a user (such as a password and biometric information such as a fingerprint) and authentication based on the authentication information is successful, the second information processor 30 releases the lock of the operation.

Second Exemplary Embodiment

An authentication system according to a second exemplary embodiment of the present invention realizes two-factor, tworoute authentication, and in many points is similar to the authentication system of the first exemplary embodiment, except that checking the result of the second authentication by the service-providing device is realized without the third authentication. The authentication system according to the second exemplary embodiment will be described below. Those portions that are common with those in the first exemplary embodiment will not be described again.

The overall structure of the system including the authentication system in the second exemplary embodiment is similar to that of the first exemplary embodiment and is shown in FIG. 1.

In the second exemplary embodiment, when the service-providing device 20 receives the first authentication information from the first information processor 10, the service-providing device 20 executes the first authentication based on the first authentication information, and cooperates with the authentication-service-providing device 40 to check whether or not the second authentication is successful for a user identified by the first authentication information. In the second exemplary embodiment, the service-providing device 20 checks whether or not the second authentication is successful within a predetermined period from the checking process. When the service-providing device 20 confirms that the first authentication is successful and the second authentication is successful, the service-providing device 20 provides a service to the first information processor 10.

Figure 6:
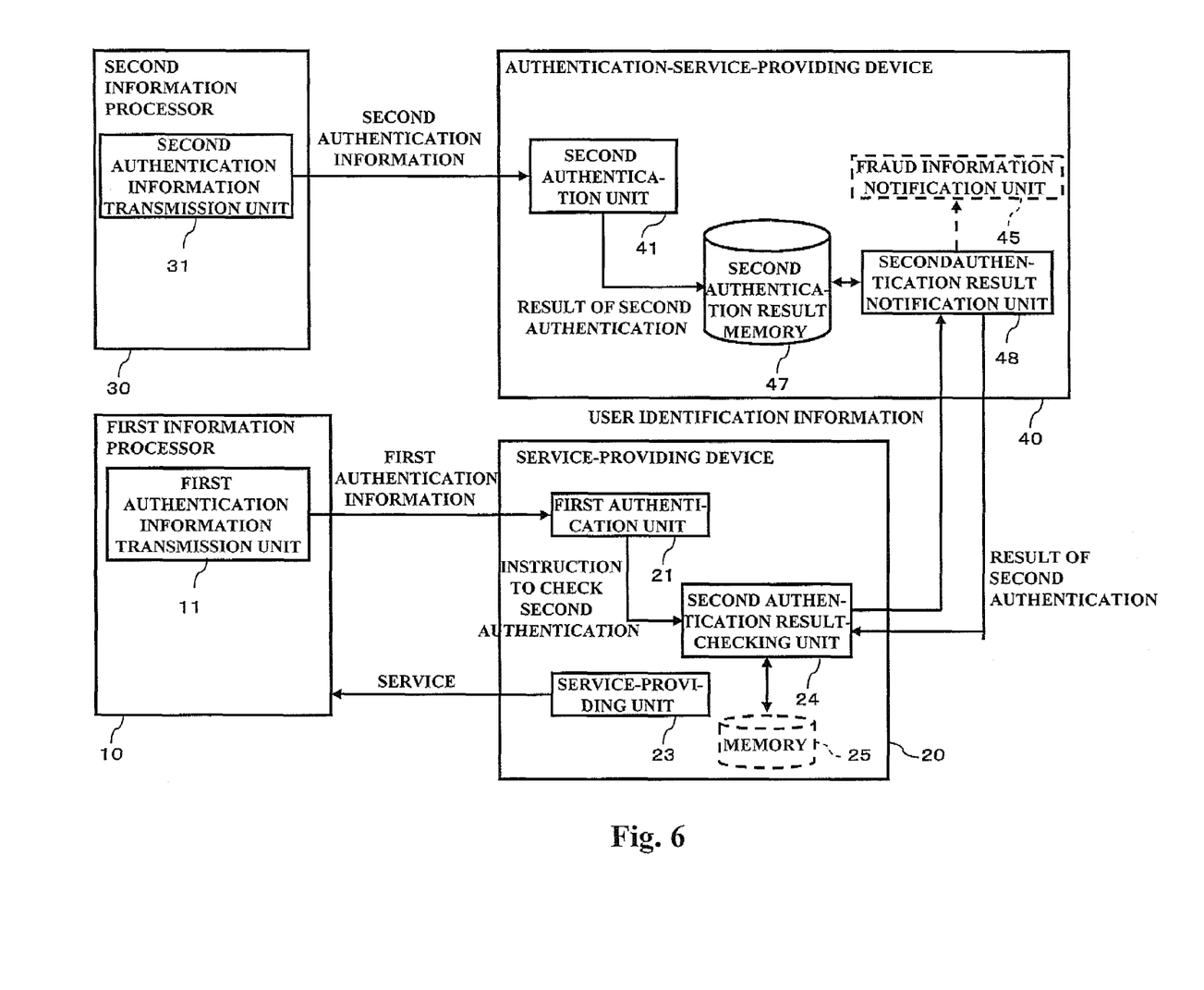
FIG. 6 is a block diagram showing a functional structure of a system including an authentication system according to a second exemplary embodiment of the present invention.

FIG. 6 is a block diagram showing a functional structure of a system including the authentication system according to the second exemplary embodiment of the present invention. Functional structures of the devices 10-40 in the system will now be described with reference to FIG. 6.

[Second Information Processor]

The second information processor 30 has a second authentication information transmission unit 31.

[Authentication-Service-Providing Device]

The authentication-service-providing device 40 has the second authentication unit 41, a second authentication result memory 47, and a second authentication result notification unit 48.

The second authentication unit 41 receives the second authentication information from the second information processor 30, executes the second authentication based on the second authentication information, and, when the second authentication is successful, stores, in the second authentication result memory 47, information indicating that the second authentication is successful (hereinafter referred to as "second authentication successful information") in relation to user identification information for identifying a user specified by the second authentication information. In the second exemplary embodiment, the second authentication successful information has a validity period and is one-time information. In other words, the second authentication successful information becomes invalid after expiration of the validity period (for example, a minute) or when the information is once used for checking the authentication result. More specifically, the authentication-service-providing device 40 deletes, from the second authentication result memory 47, the second authentication successful information after the validity period expires or when the second authentication successful information has been used once for checking the authentication result.

When the second authentication result notification unit 48 receives from the service-providing device 20 user identification information for identifying a user, the second authentication result notification unit 48 notifies the service-providing device 20 of whether or not the second authentication is successful for the user identified by the user identification information, on the basis of the stored content of the second authentication result memory 47. More specifically, the second authentication result notification unit 48 refers to the second authentication result memory 47, and, when the second authentication successful information is recorded in relation to the user identification information, the second authentication result notification unit 48 notifies the service-providing device 20 that the second authentication is successful.

[First Information Processor]

The first information processor 10 has the first authentication information transmission unit 11.

[Service-Providing Device]

The service-providing device 20 has the first authentication unit 21, the service-providing unit 23, and a second authentication result-checking unit 24.

The second authentication result-checking unit 24 cooperates with the authentication-service-providing device 40 to check whether or not a second authentication is successful for a user identified by the first authentication information received by the first authentication unit 21. In the second exemplary embodiment, the second authentication result-checking unit 24 transmits user identification information for identifying a user specified by the first authentication information to the authentication-service-providing device 40 and receives information indicating whether or not the second authentication is successful, which is reported by the authentication-service-providing device 40 in response to the user identification information. For example, when the first authentication based on the first authentication information is successful, the first authentication unit 21 transmits to the second authentication result-checking unit 24 a checking instruction of second authentication including the first authentication information, and, when the second authentication result checking unit 24 receives the instruction, the second authentication result-checking unit 24 executes the above-described checking process on the basis of the first authentication information included in the instruction.

The service-providing unit 23 provides a predetermined service to the first information processor 10 from which the first authentication information is transmitted, when it is confirmed that the first authentication is successful and the second authentication is successful.

Figure 7:
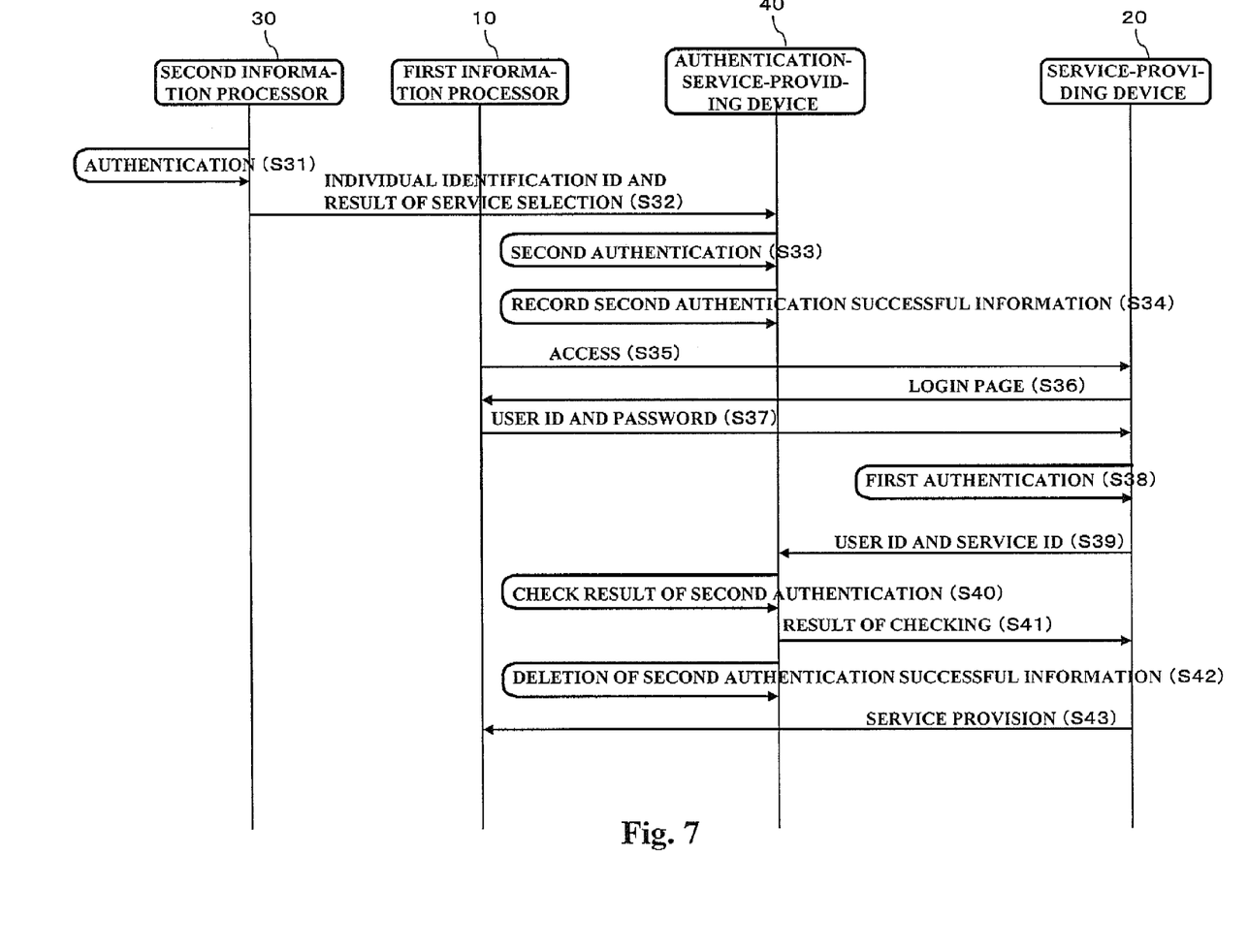
FIG. 7 is a sequence diagram showing an operation process of a system including the authentication system according to the second exemplary embodiment.

FIG. 7 is a sequence diagram showing an operation process of a system including the authentication system according to the second exemplary embodiment. An operation of the system will now be described in detail with reference to FIG. 7.

The user inputs, in the second information processor 30, authentication information (such as a password or biometric information such as a fingerprint) for releasing the lock of operation of the second information processor 30. When the second information processor 30 receives the input of the authentication information, the second information processor 30 executes authentication based on the authentication information (S31). Specifically, the second information processor 30 determines whether or not the input authentication information matches any of the information registered in the second information processor 30 in advance. When the authentication is successful; that is, when the authentication information matches information which is registered in advance, the second information processor 30 releases the lock of operation of the second information processor 30.

Then, the user inputs an address of an authentication-service-providing device 40 through the web browser of the second information processor 30. When the second information processor 30 receives the input of the address, the second information processor 30 accesses the authentication service-providing device 40 by reference to the input address. The authentication-service-providing device 40 transmits a service selection page to the second information processor 30 in response to the access, and the second information processor 30 receives the service selection page and displays the same on the web screen. The service selection page includes a list of services, and a button for instructing start of a second authentication.

The second information processor 30 receives selection of a desired service from the user on the service selection page, and, when the second information processor 30 receives an instruction to start the second authentication (in the example configuration, with a pressing operation of the second authentication start instruction button), the second information processor 30 transmits an individual identification ID of the second information processor 30 and a result of the service selection to the authentication-service-providing device 40 (S32).

When the authentication-service-providing device 40 receives the individual identification ID and the result of the service selection, the authentication-service-providing device 40 executes the second authentication based on the individual identification ID (S33).

When the second authentication fails, the authentication-service-providing device 40 notifies the second information processor 30 that the authentication has failed.

When, on the other hand, the second authentication is successful, the authentication-service-providing device 40 records second authentication successful information in the second authentication result memory 47 in relation to the individual identification ID (S34). Here, all service IDs (information for identifying the service-providing device 20 or its service) are correlated in advance to the respective individual identification ID in the second authentication result memory 47, and a flag is assigned to each service ID correlated to the respective individual identification ID. When the second authentication based on the individual identification ID is successful, the authentication-service-providing device 40 sets a flag assigned to the service ID corresponding to the selected service among the service IDs correlated to the individual identification ID. In other words, the second authentication successful information is recorded by setting the flag. For example, when the service ID corresponding to the selected service is "B" and the second authentication based on the individual identification ID of "A" is successful, a flag corresponding to a combination of the individual identification ID of "A" and the service ID of "B" is set. When the second authentication successful information is to be deleted, the set flag is cleared.

The user then inputs, in the web browser of the first information processor 10, an address of the service-providing device 20 to be used. When the first information processor 10 receives the input of the address, the first information processor 10 accesses the service-providing device 20 by reference to the address (S35). The service-providing device 20 transmits a login page to the first information processor 10 in response to the access, and the first information processor 10 receives the login page and displays the same on the web screen (S36). Here, as shown in FIG. 8, the login page includes an input column 801 for user ID and an input column 802 for password.

Figure 8:
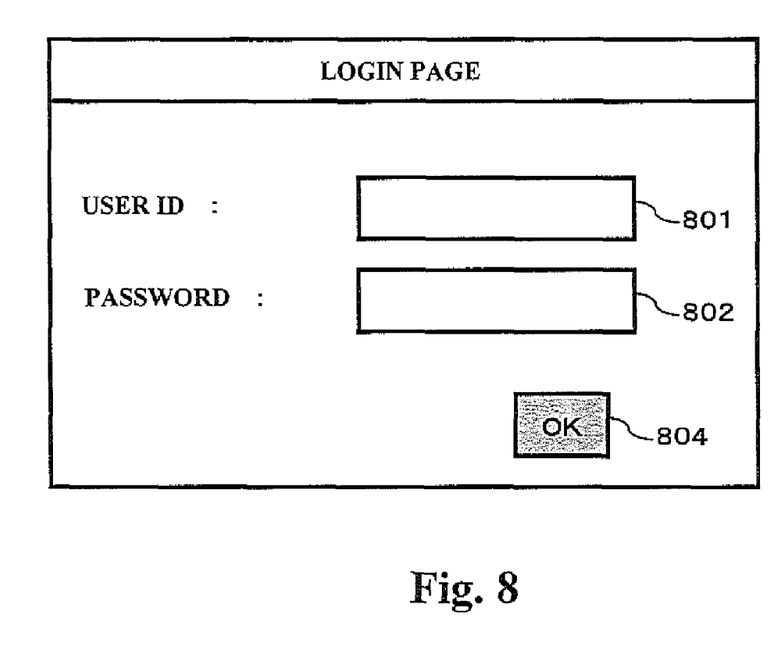
FIG. 8 is a diagram showing an exemplary login page displayed on a first information processor in the second exemplary embodiment.

The user next inputs the user ID and the password of the user on the login page shown in FIG. 8 and presses an "OK" button 804. When the first information processor 10 receives an operation of the user, the first information processor transmits the input user ID and password to the service-providing device 20 (S37).

When the service-providing device 20 receives the user ID and password from the first information processor 10, the service-providing device 20 executes the first authentication based on the user ID and password (S38).

When the first authentication fails, the service providing device 20 notifies the first information processor 10 that the authentication failed, and aborts the process.

When, on the other hand, the first authentication is successful, the service-providing device 20 transmits to the authentication service providing device 40 the user ID received from the first information processor 10 and the service ID of the service-providing device 20 (S39).

When the authentication-service-providing device 40 receives the user ID and the service ID from the service-providing device 20, the authentication-service-providing device 40 checks whether or not the second authentication is successful for the user corresponding to the user ID and for the service corresponding to the service ID (S40), and reports the result of the checking process to the service-providing device 20 (S41). Specifically, the authentication-service-providing device 40 specifies an individual identification ID corresponding to the user who is identified by the received user ID on the basis of a correspondence table, which is recorded in the authentication-service-providing device 40 in advance, between the user ID and the individual identification ID. Then, the authentication-service-providing device 40 refers to the second authentication result memory 47 to determine whether or not a flag corresponding to the combination of the specified individual identification ID and the received service ID is set. When it is determined that the flag is set, the authentication-service-providing device 40 notifies the service-providing device 20 that the second authentication is successful. When, on the other hand, it is determined that the flag is not set, the authentication-service-providing device 40 notifies the service-providing device 20 that the second authentication is not successful.

When the authentication-service-providing device 40 reports that the second authentication is successful, the authentication-service-providing device 40 clears the flag based on which the determination is made, to delete the second authentication successful information (S42). The authentication-service-providing device 40 also clears the flag when a predetermined validity period (for example, a minute) has elapsed after the flag is set.

When the service-providing device 20 receives the notification of the result of the checking process from the authentication-service-providing device 40, the service-providing device 20 applies a process according to the result of the checking process.

More specifically, when the service-providing device 20 receives a notification indicating that the second authentication is successful, the service-providing device 20 starts provision of a service to the first information processor 10 (S43). When, on the other hand, the service-providing device 20 is notified that the second authentication is not successful, the service-providing device 20 notifies the first information processor 10 that the service cannot be used.

In one aspect, during the access of the authentication-service-providing device 40 by the service-providing device 20, the authentication-service-providing device 40 may authenticate the service-providing device 20.

The below-described configurations (j)-(s) may be employed in a system according to the second exemplary embodiment.

(j) In the above-described configuration, the service-providing device 20 presents the user ID (a portion of the first authentication information) to the authentication-service-providing device 40. In configuration (j), the service-providing device 20 may present the individual identification ID (second authentication information) to the authentication-service-providing device 40. In this configuration, the service-providing device 20 has a memory 25 which stores in advance a user ID and an individual identification ID in a pair. When the first authentication for a certain user ID is successful, the service-providing device 20 identifies the individual identification ID correlated to the user ID in the memory 25 and presents the individual identification ID to the authentication-service-providing device 40. When the authentication-service-providing device 40 receives the presentation of the individual identification ID from the service-providing device 20, the authentication-service-providing device 40 refers to the second authentication result memory 47 and determines whether or not a flag is set for the individual identification ID.

(k) In the above-described configuration, the second authentication successful information is recorded by use of a flag. Alternatively, the second authentication successful information may be recorded in a different form. For example, in configuration (k), the second authentication successful information is recorded in the following form. Specifically, the second authentication result memory 47 stores a list of second authentication information in advance. When the service ID of the selected service is "B" and the second authentication based on the second authentication information of "A" is successful, the authentication-service-providing device 40 records the service ID of "B" in the second authentication result memory 47 as the second authentication successful information, in correlation with the second authentication information of "A."

(l) In configuration (l), the authentication-service-providing device 40 receives from the service-providing device 20 identification information of the first information processor 10 transmitting user identification information (for example, a user ID) along with the user identification information. Here, the identification information of the first information processor 10 may be the address of the first information processor 10 on the network (such as an IP address).

(m) In configuration (m), the authentication-service-providing device 40 may further have a fraud information notification unit 45 which notifies information related to fraud when the first authentication is successful and success of the second authentication is not confirmed. The information related to the fraud may be, for example, a message indicating that there is a possibility that the first authentication information has been fraudulently obtained and information indicating the origin of the fraudulent access (IP address or the like of the transmitting first information processor 10). The notification destination of the information related to fraud may be, for example, a user corresponding to the fraudulently obtained first authentication information (more specifically, the mail address, phone number, facsimile number, etc. of the user), the service-providing device 20 transmitting the user identification information, a service provider managing the service-providing device 20 (more specifically, the mail address, phone number, facsimile number, etc. of the service provider), the administrator of the authentication-service-providing device 40, and a memory device accumulating information related to fraud. In the configuration in which a user corresponding to the fraudulently obtained first authentication information is reported, the authentication-service-providing device 40 reports, for example, a notification destination (the mail address or the like) of the user who is registered in advance in correlation with the user identification information.

(n) In configuration (n), when the authentication-service-providing device 40 may receive a usage termination application from a user on-line or off-line, the authentication-service-providing device 40 may apply a usage termination process of the second authentication information of the user. The usage termination process may be, for example, a process to delete registration of the second authentication information or a process to set a usage termination flag corresponding to the second authentication information.

(o) Configuration (o) is similar to configuration (n), except that the authentication-service-providing device 40 may further report information related to fraud when the second authentication information from the second information processor 30 is information for which the usage termination process is applied. The information related to fraud may be, for example, a message indicating that there is a possibility that the second authentication information has been fraudulently obtained or a message indicating that there is a possibility that the second information processor 30 has been fraudulently obtained. The notification destination of the information related to fraud may be, for example, a user corresponding to the fraudulently obtained second authentication information (more specifically, the mail address, phone number, facsimile number, etc. of the user), the administrator of the authentication-service-providing device 40, or a memory device accumulating the information related to fraud.

(p) In the above-described configuration, the service-providing device 20 obtains the checking result of the second authentication from the authentication-service-providing device 40. In configuration (p), the actual determination of whether or not the second authentication is successful may be made by the service-providing device 20. In this configuration, the authentication-service-providing device 40 uses an arbitrary method to provide to the service-providing device 20 information similar to the stored content of the second authentication result memory 47.

(q) In the above-described configuration, the service-providing device 20 (or service) is specified and the second authentication is executed. In configuration (q), the second authentication may be executed without specifying the service.

(r) In configuration (r), the second information processor 30 (such as, for example, a portable phone) may be connected to the authentication-service-providing device 40 via the first information processor 10. For example, the second information processor 30 may communicate with the authentication-service-providing device 40 via the first information processor 10 and the Internet N1. The communication between the second information processor 30 and the first information processor 10 may be wireless, such as via infrared communication, or through a wire, such as via a cable connection.

(s) In configuration (s), the first information processor 10 and the second information processor 30 may be realized by a physically combined device. For example, it is possible to realize the first information processor 10 with a first application software and the second information processor 30 with a second application software in one computer.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with various modifications as are suited to the particular use contemplated. It is intended that the scope of the invention be defined by the following claims and their equivalents.

What is claimed is:

1. An authentication system comprising:
a first information processor;
a second information processor;
an authentication-service-providing device; and
an authentication device;
said second information processor including,
   a second authentication information transmission unit that transmits second authentication information for authenticating a user to the authentication-service-providing device, and
   an authentication information obtaining unit that obtains third authentication information issued by the authentication-service-providing device in response to the second authentication information;
said authentication-service-providing device including,
   a second authentication unit that receives the second authentication information from the second information processor and executes a second authentication based on the second authentication information, and
   an authentication information issuance unit that issues the third authentication information to the second information processor when the second authentication is successful;
said first information processor including,
   a first authentication information transmission unit that receives input of first authentication information for authenticating the user and transmits the first authentication information to the authentication device, and
   a third authentication information transmission unit that receives input of third authentication information obtained by the second information processor and transmits the third authentication information to the authentication device;
said authentication device including,
   a first authentication unit that receives the first authentication information from the first information processor and executes a first authentication based on the first authentication information, and
   a third authentication result obtaining unit that receives the third authentication information from the first information processor and cooperates with the authentication-service-providing device to obtain a result of a third authentication based on the third authentication information.

2. An authentication system comprising:
an authentication-service-providing device; and
an authentication device, wherein the authentication-service-providing device comprises:
a second authentication unit that receives second authentication information for authenticating a user from a second information processor and executes a second authentication based on the second authentication information; and
an authentication information issuance unit that issues third authentication information to the second information processor when the second authentication is successful;
said authentication device including,
   a first authentication unit that receives first authentication information for authenticating the user from a first information processor and executes a first authentication based on the first authentication information, and
   a third authentication result obtaining unit that receives, from the first information processor, third authentication information obtained by the second information processor and input to the first information processor and cooperates with the authentication-service-providing device to obtain a result of a third authentication based on the third authentication information.

3. An authentication-service-providing device comprising:
a second authentication unit that receives second authentication information for authenticating a user from a second information processor and executes a second authentication based on the second authentication information;
an authentication information issuance unit that issues third authentication information to the second information processor when the second authentication is successful; and
a third authentication unit that receives third authentication information from an authentication device which receives first authentication information for authenticating the user from a first information processor, executes a first authentication based on the first authentication information, and receives, from the first information processor, the third authentication information obtained by the second information processor and input to the first information processor, and that executes a third authentication based on the received third authentication information and the issued third authentication information, and reports a result of the third authentication to the authentication device.

4. The authentication-service-providing device according to claim 3, wherein the third authentication unit receives, from the authentication device, identification information of the first information processor transmitting the third authentication information, along with the third authentication information.

5. The authentication-service-providing device according to claim 3, further comprising:
a fraud information notification unit that reports information related to fraud when the first authentication is successful and the third authentication fails.

6. The authentication-service-providing device according to claim 4, further comprising:
a fraud information notification unit that reports information related to fraud when the first authentication is successful and the third authentication fails.

7. The authentication-service-providing device according to claim 3, wherein the third authentication information has a validity period and is one-time information.

8. An authentication-service-providing device comprising:
a second authentication unit that receives second authentication information for authenticating a user from a second information processor and executes a second authentication based on the second authentication information;
an authentication information issuance unit that issues third authentication information to the second information processor when the second authentication is successful; and
an authentication-information-providing unit that provides issued third authentication information to an authentication device which receives first authentication information for authenticating the user from a first information processor, executes a first authentication based on the first authentication information, and receives, from the first information processor, third authentication information obtained by the second information processor and input to the first information processor.

9. A method for providing an authentication service, comprising:
- receiving second authentication information for authenticating a user from a second information processor and executing a second authentication based on the second authentication information;
- issuing third authentication information to the second information processor when the second authentication is successful; and
- cooperating with an authentication device which receives first authentication information for authenticating the user from a first information processor, executes a first authentication based on the first authentication information, and receives, from the first information processor, the third authentication information obtained by the second information processor and input to the first information processor, to obtain a result of a third authentication based on the third authentication information.

10. The method for providing an authentication service according to claim 9, wherein the cooperating is comprising:
- receiving the third authentication information from the authentication device;
- executing a third authentication based on the received third authentication information and the issued third authentication information; and
- reporting a result of the third authentication to the authentication device.

11. The method for providing an authentication service, according to claim 9, wherein the cooperating is comprising:
- providing the issued third authentication information to the authentication device.

12. A non-transitory computer readable medium storing a program causing a computer to execute a process for providing an authentication service, the process comprising:
- receiving second authentication information for authenticating a user from a second information processor and executing a second authentication based on the second authentication information;
- issuing third authentication information to the second information processor when the second authentication is successful; and
- cooperating with an authentication device which receives first authentication information for authenticating the user from a first information processor, executes a first authentication based on the first authentication information, and receives, from the first information processor, the third authentication information obtained by the second information processor and input to the first information processor, to obtain a result of a third authentication based on the third authentication information.

13. The non-transitory computer readable medium according to claim 12, wherein the cooperating comprising:
- receiving the third authentication information from the authentication device;
- executing a third authentication based on the received third authentication information and the issued third authentication information; and
- reporting a result of the third authentication to the authentication device.

14. The non-transitory computer readable medium according to claim 12, wherein the cooperating comprising:
- providing the issued third authentication information to the authentication device.

15. An authentication system comprising:
- a first information processor;
- a second information processor;
- an authentication-service-providing device; and
- an authentication device;
- said second information processor including a second authentication information transmission unit that transmits to the authentication-service-providing device second authentication information for authenticating a user;
- said authentication-service-providing device including a second authentication unit that receives the second authentication information from the second information processor and executes a second authentication based on the second authentication information;
- said first information processor including a first authentication information transmission unit that receives input of first authentication information for authenticating the user and transmits the first authentication information to the authentication device; and
- said authentication device including a first authentication unit that receives the first authentication information from the first information processor and executes a first authentication based on the first authentication information, and a second authentication result checking unit that cooperates with the authentication-service-providing device to check whether or not the second authentication is successful for a user specified by the first authentication information.

16. An authentication system comprising:
- an authentication-service-providing device; and
- an authentication device;
- said authentication-service-providing device including a second authentication unit that receives second authentication information for authenticating a user from a second information processor and executes a second authentication based on the second authentication information; and
- said authentication device including,
  - a first authentication unit that receives first authentication information for authenticating the user from a first information processor and executes a first authentication based on the first authentication information, and
  - a second authentication result-checking unit that cooperates with the authentication-service-providing device to check whether or not the second authentication is successful for a user specified by the first authentication information.

17. An authentication-service-providing device comprising:
- a second authentication unit that receives second authentication information for authenticating a user from a second information processor, executes a second authentication based on the second authentication information, and records, when the second authentication is successful, in a second authentication result memory, information indicating that the second authentication is successful, in correlation with user identification information for identifying a user specified by the second authentication information; and
- a second authentication result notification unit that receives, from an authentication device which receives first authentication information for authenticating the user from a first information processor and executes a first authentication based on the first authentication information, user identification information for identifying a user specified by the first authentication information, and notifies the authentication device as to whether or not the second authentication is successful for a user identified by the user identification information, on the basis of a stored content of the second authentication result memory.

18. A method for providing an authentication service, comprising:

receiving from a second information processor second authentication information for authenticating a user, executing a second authentication based on the second authentication information, and recording, when the second authentication is successful, in a second authentication result memory, information indicating that the second authentication is successful, in correlation with user identification information for identifying a user specified by the second authentication information; and receiving, from an authentication device which receives first authentication information for authenticating the user from a first information processor and executes a first authentication based on the first authentication information, user identification information for identifying a user specified by the first authentication information, and notifying the authentication device as to whether or not the second authentication is successful for a user identified by the user identification information, on the basis of a stored content of the second authentication result memory.

19. A non-transitory computer readable medium storing a program causing a computer to execute a process for providing an authentication service, the process comprising:

receiving from a second information processor second authentication information for authenticating a user, executing a second authentication based on the second authentication information, and recording, when the second authentication is successful, in a second authentication result memory, information indicating that the second authentication is successful, in correlation with user identification information for identifying a user specified by the second authentication information; and receiving, from an authentication device which receives first authentication information for authenticating the user from a first information processor and executes a first authentication based on the first authentication information, user identification information for identifying a user specified by the first authentication information, and notifying the authentication device as to whether or not the second authentication is successful for a user identified by the user identification information, on the basis of a stored content of the second authentication result memory.

\* \* \* \* \*